United States Patent Office 2,715,698
Patented Aug. 16, 1955

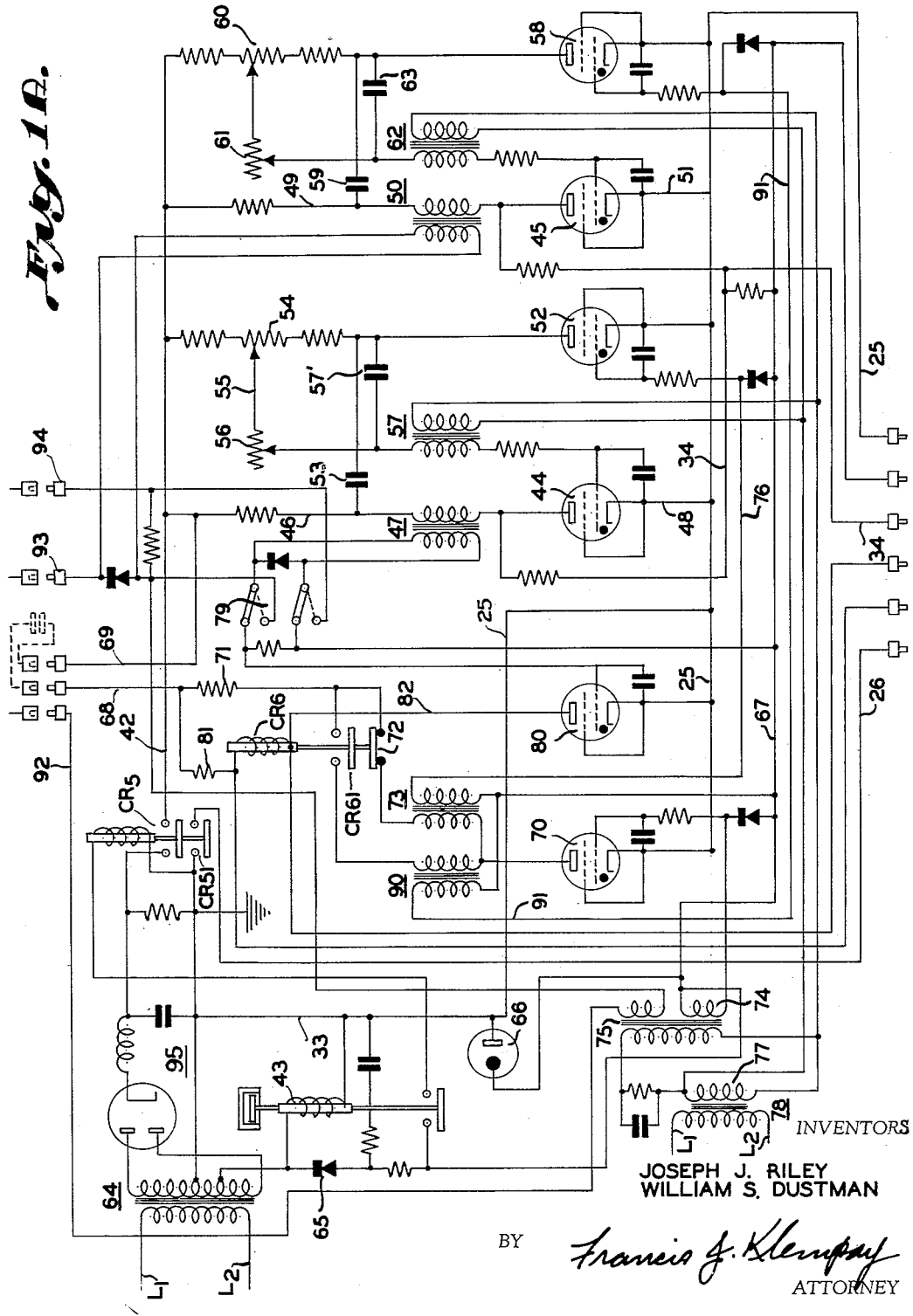

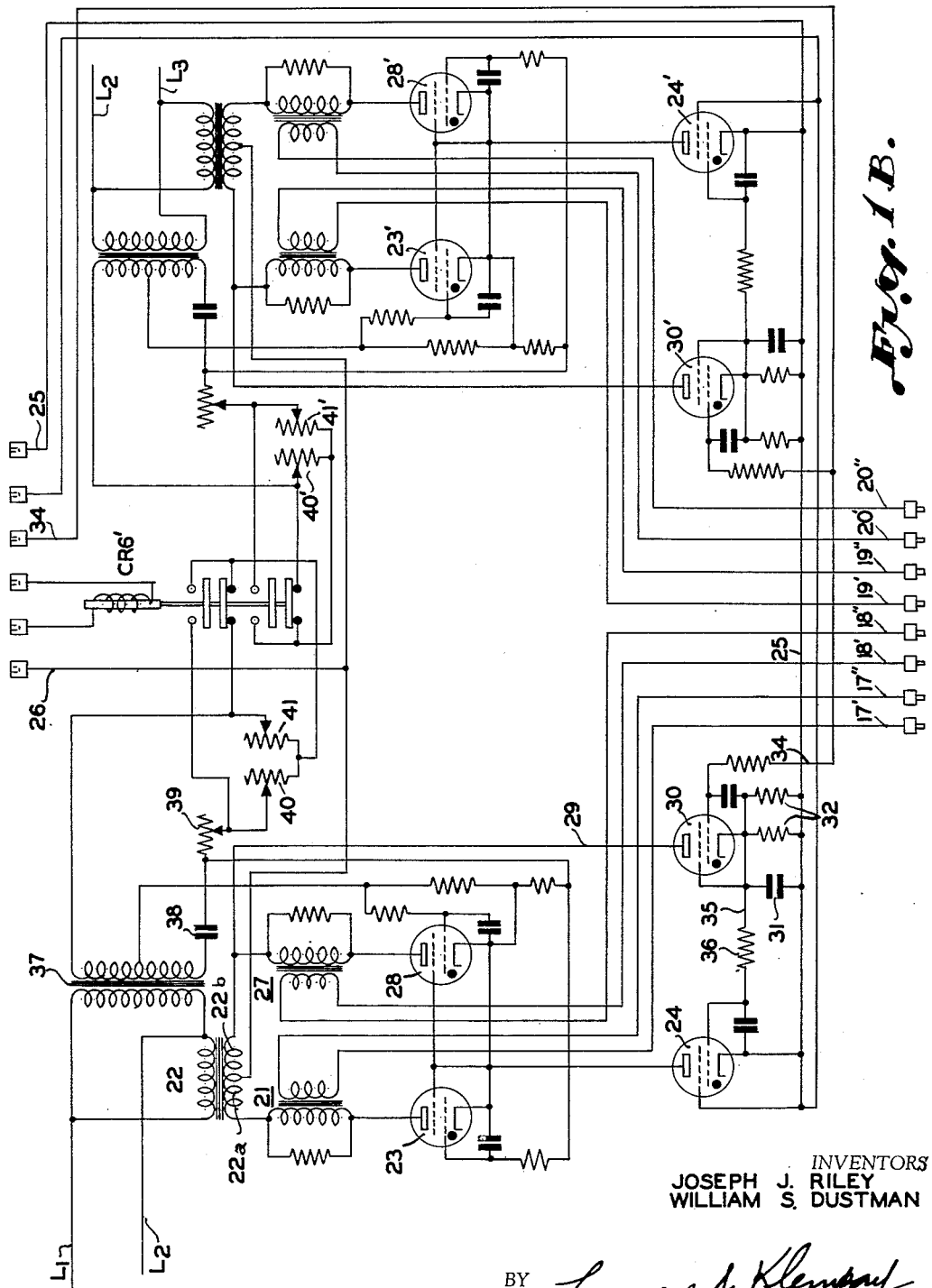

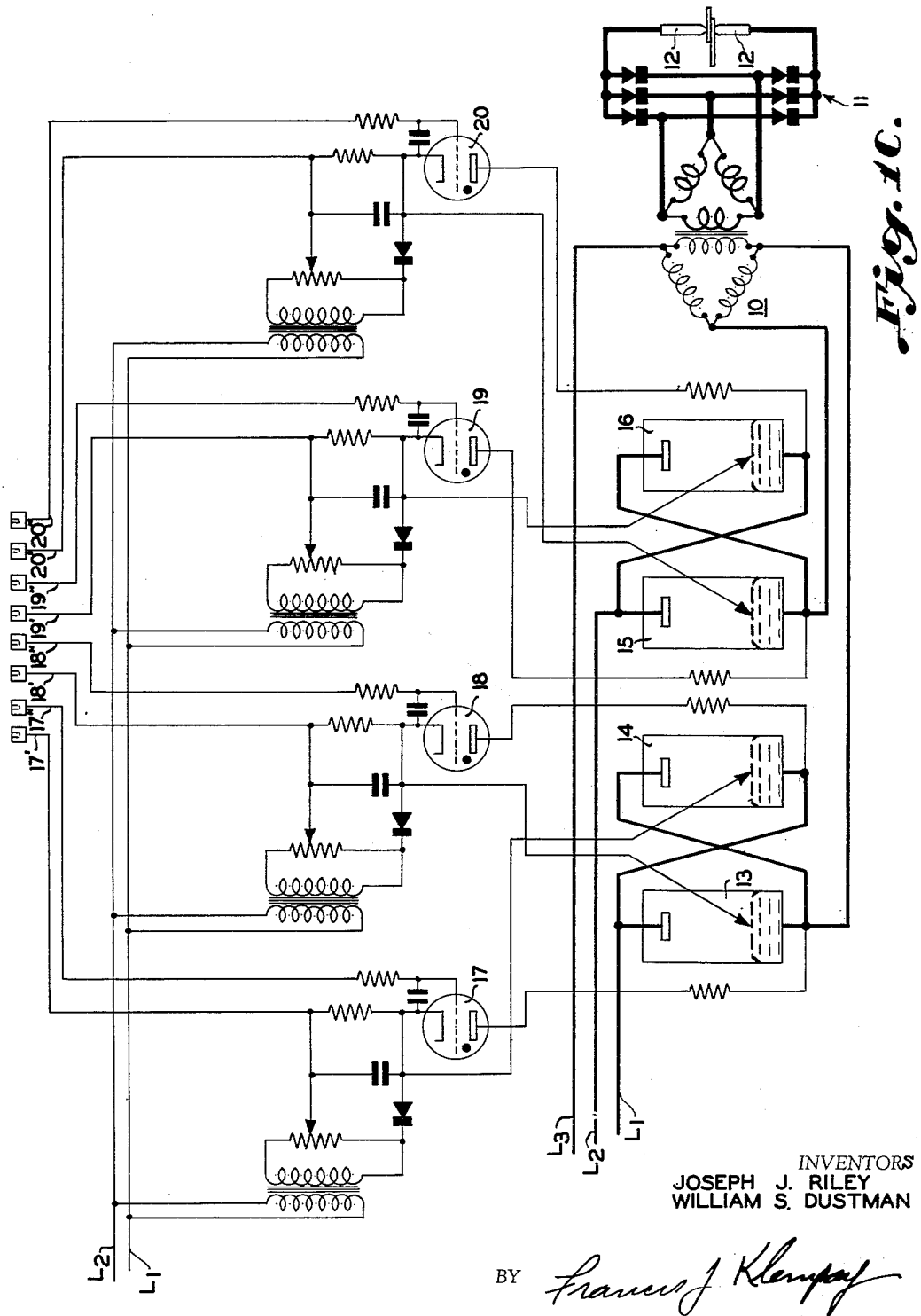

2,715,698

POWER CONTROL CIRCUIT PARTICULARLY FOR ELECTRIC RESISTANCE WELDERS

Joseph J. Riley and William S. Dustman, Warren, Ohio, assignors to The Taylor-Winfield Corporation, Warren, Ohio, a corporation of Ohio Application August 15, 1951, Serial No. 242,002

6 Claims. (Cl. 315—197)

This invention relates to electric power control circuits and more particularly to improved circuit arrangements for controlling the flow of resistance welding and/or resistance heating current to the power transformer of an electrical resistance welding machine, for example. The primary object of the invention is the provision of improved control circuit arrangements for the general purpose indicated which while having normally desired extreme accuracy and consistency in timing the number of cycles of the alternating current source applied during the weld period and/or applied during a post-heat period, for example, is nevertheless durable and entirely practical in actual industrial use, is capable of being assembled and continuously operated without dependency on extreme accuracy of operation of various circuit components such as discharge devices, capacitors, and potentiometers, and is readily adaptable to a "sub-assembly" style of manufacture whereby the effective industrial utilization and maintenance of the complete control system is facilitated.

A further object of the invention is the provision in control apparatus of the general character outlined above and having the usual general provisions for timing the number of cycles of the source applied first for welding and thereafter for post-heating or annealing and for predetermining during each such part of a cycle of operation the portions of the consecutive half cycles of the source to be translated, of improved circuit arrangements for positively separating and individually controlling the consecutive parts of the complete operational cycle while yet minimizing the hiatus between the two to thereby insure both the precision of adjustable control over the quantity and time distribution of the energy translated for each part, and an improved continuity in the flow of welding and post-heating current which is highly desirable in certain difficult resistance welding operations as in effecting welds of aircraft quality in aluminum, for example.

Another object of the invention is the provision of power control apparatus having the characteristics above outlined which can be readily interconnected with other control apparatus for sequencing the actuations of mechanical parts of an electric resistance welding machine such as electrode-carrying members, for example, whereby the control apparatus of this invention may as a self integrated unit but in combination with the particular conventional sequence control required for the individual machine to which it is applied constitute a precision welder control of such completeness and versatility that it may be taken as standard control apparatus for precision welding under almost limitless variations in operating conditions. Thus the apparatus is as readily adaptable for three-phase power as for single phase power and in any combination the duration of and rate of current flow may be precisely controlled, provision is made for the avoidance of unbalance in the direction of current flow through the welding transformer primarily and welding may be effected with or without post-heating or, alternatively, the second time phase may be used for welding while the first is used for pre-heating.

All of the above is brought about by the principles of the present invention through the conception of segregating the various individual control instrumentalities of the system into three sections or sub-assemblies which in actual practice may be physically separated into different units and interconnected by quick detachable multiple-conductor connectors which will be apparent to those skilled in the art. The first section may contain, in accordance with the hereinafter described preferred embodiment of the invention, a suitable control power supply and precision types of timing and recycling circuits whereby at the start of a welding cycle an initiating signal is furnished synchronously with the voltage wave of the source and at a precisely measured later time a second signal is furnished to interrupt the flow of welding current at the completion of translation of the particular cycle of the source which is then occurring, whereby simultaneously with the generation of said second signal a relay is actuated to condition the primary translating means for transmission of power at a different rate than may be required in post-heating, for example, whereby the generation of a third initiating signal is delayed until the said relay is fully actuated. The third signal is utilized to re-initiate the power current flow, translate the post-heat current and the timing assembly thereafter produces a fourth signal to condition the translator for interruption at the expiration of the particular signal of the current source then existent. It should be observed that the timing assembly is in effect a device for issuing impulses at timed intervals and being more or less self contained and free from extraneously generated transients may be readily adjusted independently and may be made dependable in consistent operation.

The second section or unit of the control apparatus of our invention comprises essentially a device for furnishing conditioning impulses selectively at the start of or during any portion of the consecutive half cycles of the voltage wave of the alternating current source, either in a single phase or in the consecutive phases of a multiple phase source, for effecting conduction in electronic power translators such as discharge devices having mercury pool cathodes with electrostatic igniters under the primary or general control of the impulses furnished by the first or timing section. The second or intermediate section, however, may have integrally combined with it the phase shifting or other control arrangement for predetermining the portions of the consecutive half cycles of the source translated and also means to always initiate conduction in a half cycle of the same polarity in a single phase or in any of the multiple phases of the source while insuring translation of the opposite polarity half cycle before interrupting all conduction. The relay above referred to operates to abruptly shift the adjustment of the phase shifting circuit so that the rate of current flow may be less during the post-heat period and, of course, suitable manual adjustment is provided to preset the rate of current flow in both the weld and post-heat periods. The phase shifting circuits are conveniently associated physically with the second section of the control apparatus as logically they are monitors intermediate the general timing assembly and the power discharge section of the apparatus.

The control impulses generated by the second section of the apparatus above outlined are passed through suitable conductors and utilized in the third or contactor section of our control apparatus which is more or less of conventional construction in that it comprises, if arranged for a three-phase operation, a solid conductor in one of the three lines and a pair of inversely connected discharge devices in each of the other two conductors with each of the discharge devices having a mercury pool cathode and an ignition electrode having electrostatic contact with the mercury. As is well known in the art and as we have employed the same here conduction may be initiated in such discharge devices by passing current through the ignition electrodes and cathodes in timed relation to the voltage wave of the applied alternating current source under the control of gaseous discharge devices which are connected in series with such ignition electrodes. In our apparatus, we utilize the conventional practice of applying the above mentioned conditioning impulses to the control grids of the gaseous discharge devices.

For a better understanding of the principles of our invention and of the various advantages, particularly of a practical industrial nature, which flow therefrom reference should be had to the following detailed specification and the accompanying drawing wherein there is disclosed a certain representative embodiment of the invention.

The drawing, on three sheets, is a schematic representation of a complete electric power control system constructed and arranged in accordance with the principles of our invention and for convenience in future reference the three principal parts or sections of the control system are designated respectively Figure 1A, Figure 1B and Figure 1C.

Section C of the complete control system herein shown is substantially of known and conventional construction for controlling the flow of power from a three-phase alternating current source comprised of the line conductors L1, L2 and L3 connected to a three-phase power transformer 10 which is shown as supplying its reduced voltage output to a rectifier assembly 11 which in turn furnishes direct current to the welding electrodes 12. Thus, conductor L3 is connected directly to one terminal of the primary winding of transformer 10 while conductor L1 is connected to another terminal of the primary winding through a pair of discharge valves 13 and 14 which are connected in inverse parallel relation and each of which is provided with a mercury pool cathode and an immersion type of ignition electrode whereby the positive and negative half cycles of the current of the two phases handled by conductor L1 may be transmitted as desired. Similarly a pair of inversely connected and similar discharge valves 15 and 16 conduct predetermined portions of the positive and negative half cycles of the current wave in the two phases of the source handled by conductor L2 to the third terminal of the primary winding of the power transformer 10. Arranged in a suitable circuit in series with the ignition electrode of the discharge valve 14 is a gaseous discharge device 17—the series circuit including the supply conductors L3 and L1 whereby there may be applied to the ignition electrode of valve 14 a current impulse to initiate conduction in this valve during certain of the half cycles of the current source and at predetermined times during these certain half cycles. As shown, the gaseous discharge device 17 is grid-controlled and its control potential is furnished by conductors 17' and 17". A similar gaseous discharge device 18 is provided to time the application of ignition current to valve 13, device 19 is provided for valve 16, and device 20 is similarly provided for valve 15. Grid control circuits 18'—18", etc. are provided for the devices 18, 19 and 20.

It is the function of control section B to apply to each of the four control grid circuits 17'—17" through 20'—20" periodic control potentials which bear a predetermined phase relation to the particular half cycles of the current source which are transmittible by the particular valves with which these circuits are associated, all as determined by phase shifting networks integrally contained in section B. It is also the function of control section B to insure that the transmission of power to the load is always initiated on a half cycle of the same polarity and always terminates at the end of a half cycle of opposite polarity which follows the receipt of a timing impulse from the apparatus of section A which will be described in detail below. This mode of operation not only avoids unidirectional saturation of the welding transformer but due to the inherent keying action provided by the inherent continuance of conduction through the last half cycle of opposite polarity provides a time hiatus which we utilize to ready certain circuits for the transmission of different current values in advance of the timed initiation of this second operational phase. The keying action enables us to distinctly separate the involved regulatory phases of the complete operational cycle and to thereby obtain a wider range of adjustability, greater precision, and greater dependability than has heretofore been obtained in comparable apparatus while at the same time enabling the current flow in the second phase to be initiated almost simultaneously upon the cessation of current flow in the first timed phase. The above outlined mode of operation of the control section B is accomplished by the apparatus now to be described. Since the control for the full-wave contactor comprised of the valves 15—16 is identical to the control for the contactor comprised of the valves 13 and 14, only the latter will be described in detail.

The control current impulses are furnished the circuit 17'—17" by the secondary of a transformer 21 the primary of which is in an energizing circuit comprising in series the secondary winding section 22a of a transformer 22 (derives energy from line conductors L1 and L2), primary of transformer 21, grid-controlled gaseous discharge device 23, grid-controlled gaseous discharge device 24, conductor 25, conductor 33, normally opened contacts CR51 of relay CR5 (section A), and conductor 26 to the center tap of winding 22a. A similar circuit arrangement comprised of the transformer 27 and grid-controlled gaseous discharge device 28 which is energized from transformer secondary winding section 22b is provided to furnish control impulses to the control circuit 18'—18" and again this impulse furnishing circuit includes the discharge device 24, conductors 25 and 33, contacts CR51, and conductor 26.

To provide for the timed conduction in the device 24 and consequently for the timed energization of the transformers 21 and 27 and for other purposes we provide a circuit comprised of the transformer secondary section 22b, conductor 29, a grid-controlled gaseous discharge device 30, parallel connected capacitor 31 and resistors 32, conductor 25, conductor 33, relay contact CR51 and conductor 26 back to winding 22b. A grid biased circuit for the discharge device 30 is comprised of the conductor 34 and for the present we will merely state that normally the potential on conductor 34 is relatively negative but upon actuation of the sequencing and timing section A to initiate power flow the potential is swung far positive to initiate conduction in device 30 upon the alternating potential in winding 22b becoming positive with respect to the device 30. Immediately upon device 30 beginning to conduct capacitor 31 is charged in a positive direction with respect to the grid of device 24 to which it is connected through conductor 35 and resistor 36 and device 24 is thereby conditioned for conduction and at this point it should be noted particularly that the parameters of capacitors 31 and resistors 32 are so chosen that the sustaining potential of the capacitor 31 remains in effect for somewhat less than one-half cycle of the source following the end of the positive half cycle furnished by transformer winding 22b. Of course, capacitor 31 is charged instantaneously and we can therefore consider the devices 24 and 31 as beginning to conduct simultaneously upon the appearance of a positive half cycle of the source in the phase transmitted by line conductors L1, L2 to which the primary of transformer 22 is connected while upon extinguishment of the sustaining potential in conductor 34 at the end of a power conduction period the device 24 will remain in condition for conduction during substantially the whole of the negative half cycle of the source following the termination of the particular positive half cycle at the termination of which conduction in device 30 was ended.

Periodic control potentials are furnished the devices 23 and 28 by a transformer 37 through a phase shifting network comprised of capacitor 38, potentiometer 39, and either potentiometer 40 or potentiometer 41, depending on the particular part of the complete operational cycle which is in being. The shift from potentiometer 40 to potentiometer 41 is made by the contactors on relay CR6' which may be either separate from a relay CR6 in section A as shown or which may be incorporated with relay CR6, depending on wiring preferences. Also, the immediate leads to potentiometers 40 and 41 will be brought out to a readily accessible control panel for ease in adjustment as will be understood. The potentiometer 40 may be utilized to determine the portions of the consecutive half cycles of the current source in the phase handled by the line conductors L1, L2 which are transmitted to the welding period, for example, while the potentiometer 41 is utilized to adjust strength of current through a post heat period, for example. It should be understood at this point that a similar two-step phase shifting network comprised of potentiometers 40' and 41' acting through discharge device 23' and 28' and discharge device 30' determines the strength of current translated by valves 15 and 16 from the phase which is handled by line conductors L2 and L3. In actual practice, the potentiometers 40 and 40' are ganged, also the potentiometers 41 and 41'. The duplicate circuits described inherently provide an effective control over the strength of current conducted to the welding transformer 10 from the third phase handled by the line conductors L1, L3 as will be understood by those familiar with the art.

Referring now to the timing and sequencing section A of our control circuit, the same includes a conventional rectifier and filter assembly 95 for furnishing D. C. potential across conductors 42 and 25, conductor 25 being connected to the source through conductor 33 as will be observed. Reference numeral 43 designates a time delay relay which withholds energization of relay CR5 and consequently of the direct current conductors 42 and 25 until the cathodes of the various discharge devices are properly heated. A suitable contactor or switch, not shown, is employed to control the energization of line conductors L1, L2 which is herein taken as a source of control potential and immediately upon such energization and the subsequent closure of relay CR5 a pair of discharge devices 44 and 45 will begin to conduct immediately, it being observed that the device 44 is connected across the D. C. source 42, 25 through conductor 46, primary winding of transformer 47 and conductor 48, while device 45 is connected across this source through conductor 49, primary of transformer 50, and conductor 51. Also connected across this source is a discharge device 52 which is generally in parallel with device 44 and has its anode connected to the anode of device 44 through capacitor 53 and the primary of transformer 47. The anode of device 52 is also connected to the positive conductor 42 through a resistor 54 which has a tap 55 connected through potentiometer 56 and the secondary of transformer 57 to the control grid of device 44. In parallel with potentiometer 56 and a portion of resistance 54 is a timing capacitor 57'. A similar parallel circuit for the device 45 is provided in the form of discharge device 58, anode coupling capacitor 59, resistor 60, potentiometer 61, transformer 62 and timing capacitor 63.

A source of regulated direct current biasing potential for discharge devices 52 and 53 is provided by the portion of the secondary winding of the control power transformer 64, rectifier 65, and a gaseous diode 66 which functions to maintain the potential in a line conductor 67 at a pre-fixed lower value than the potential in conductor 25 to which the cathodes of devices 52 and 58 are connected. The control grids of devices 58 and 59, being connected to the conductor 67 will have a normal negative bias and these devices will therefore be held nonconductive initially.

To initiate a cycle of operation after conditioning of the control to the extent above described we provide an initiating circuit in the form of conductors 68 and 69 which lead outwardly to a suitable switch, not shown, in a master sequence control for the complete equipment and which are adapted to be held connected during the whole of a cycle of operation. When connected, the conductors 68 and 69 furnish plate potential to a discharge device 70 through resistance 71, normally closed contactor 72 of relay CR6 and primary winding of transformer 73. The control grid for device 70 is in a circuit including diode 66 and the secondary winding 74 of a transformer 75 which derives its energy indirectly from line conductors L1 and L2 and upon the potential in the winding 74 swinging sufficiently in a positive direction to overcome the negative potential regulated by the diode 66 the device 70 will begin to conduct. In doing so it will generate a current pulse in the secondary of transformer 73 which through conductor 76 will be transmitted to the control grid of device 52 to overcome the normal negative grid bias furnished by the conductor 67 and the device 52 will begin to conduct. Thereupon the dynamic action of capacitor 53 will momentarily withdraw anode potential from device 44 and the latter will be extinguished. It should be noted that there is connected to the anode of device 44 through suitable resistance the conductor 34. While device 44 is conducting the potential in conductor 34 is at the potential in conductor 25 plus only the arc drop across the device 44 and is therefore sufficiently negative to withhold conduction in the devices 30 and 30' of section B. Upon device 44 being snuffed out, however, the potential in conductor 34 rises rapidly to the potential in conductor 42 and thereupon the devices 30 and 30' begin to conduct to begin a power supply period. This may be the actual weld period and its length is determined by the rate of discharge of timing capacitor 57' through potentiometer 56, it being understood that during conduction in device 44 grid rectification in this device brought the potential of the grid connected terminal of capacitor 57' down substantially to the potential of conductor 25, plus only the arc drop between the grid and cathode of this device. Now as timing capacitor 57' discharges its grid connected terminal becomes progressively more positive at a rate determined by the tap settings of potentiometer 56 and resistor 54 and eventually it is sufficient, when coupled with an A. C. bias furnished by secondary winding 77 of transformer 78, to initiate conduction in device 44 which thereupon immediately reduces the potential in conductor 34 to extinguish devices 30 and 30' while through the action of capacitor 53 extinguishing device 52. Since the A. C. bias furnished by the transformer secondary 74 to initiate conduction in devices 70 and 52 thereby starting a period is keyed to the A. C. bias furnished by transformer secondary 77 to re-initiate conduction in device 44 to stop the period, both the starting and stopping of the enabling potential applied to the grid of valve 30 may be made to take place in half cycles of the same polarity so that power conduction always starts during a half cycle of one polarity and ends upon the expiration of a half cycle of opposite polarity due to the action of capacitor 31 so that the timing is always in substantially full cycle increments which makes for uniformity in operation, regardless of variations in the operational characteristics of individual components, and for freedom from power transformer saturation. Also, consistency results even though considerable variation in the exact synchronous timing of the "start" signal and the "stop" signal furnished by section A to section B.

If the control system is arranged to apply to the work or load a first period of one current strength to be followed by a second period of another current strength as in welding and post heating, for example, a double-pull double-throw switch 79 is moved to position shown in the drawing whereby the secondary of transformer 47 is connected in the control grid circuit of a discharge device 80 which in turn is connected across the D. C. control power supply through the circuit comprised of conductors 42 and 25, the external initiating switch above referred to, conductor 69, resistor 81, coil of relay CR6, and conductor 82. Therefore upon re-initiation of conduction in device 44 the device 80 will be caused to conduct to pull in relays CR6 and CR6'. During the first period of power conduction with relays CR6 and CR6' deenergized the phase shifting circuits comprised of the potentiometers 40 and 40' are in control. Upon energization of these relays the potentiometers 41 and 41' are in control to determine the portions of the consecutive half cycles of the current source transmitted.

Upon the relay CR6 becoming energized its contactor CR61 will close to connect the primary of a transformer 90 in the anode circuit of device 70 across the D. C. control current source. Device 70 will be extinguished at the time contactor CR61 closes due to the opening of contactor 72 and conduction in device 70 will be re-initiated only upon the application to the grid thereof of a synchronous pulse of proper polarity from transformer secondary 74. The reinitiation of conduction in device 70 furnishes a current impulse to conductor 91 which leads from the secondary of transformer 90 and upon this impulse being applied to the grid of device 58 the latter conducts to rock out device 45 through action of the capacitor 59 and again the potential in conductor 34 rises to high positive value to condition devices 30 and 30' in section B for conduction.

It should be observed particularly that power is conducted for at least one-half cycle of the source after the "off" signal caused by extinguishment of device 44 due to the action of the circuits in section B and this half cycle time interval is advantageously used for actuation of relay CR6 and for conditioning of various circuits to be used in the control application of power in the second period. The two periods of current flow can therefore follow each other almost instantaneously while yet enabling a distinct segregation of the timing and other control factors in the two periods to be effected.

The second period timing is effected by discharge of timing capacitor 63 through potentiometer 61 and upon the expiration of the pre-set timing conduction is re-initiated in device 45 to decrease the potential in conductor 34 thereby furnishing the "off" signal to control section B. Again, the final timing of re-initiation of conduction in device 45 is effected by an A. C. bias furnished by transformer secondary 77 through transformer 62. Control section A is provided with external connectors 92, 93 and 94 which lead to an associated control assembly, not shown, which is employed to provide the master control over the entire machine assembly. Transformer 50 which is in the anode circuit of device 45 furnishes a signal to these external connections to indicate the completion of an operational cycle. If the second power period is not to be employed the switch 79 is moved to the position opposite that shown so that upon timing out of the first period and re-initiation of conduction in device 44 the impulse furnished by transformer 47 is fed to these external connections to indicate the completion of an operational cycle rather than to the grid of device 80 to actuate relay CR6 as explained above.

It should now be apparent that we have provided an improved electric power control system which accomplishes the objects initially set out in that it provides for the distinct separation of consecutive power periods to allow a maximum of accuracy in the length of these periods and in the strength of current transmitted in each of them while yet providing for their quick succession. Of greatest importance is the accuracy and consistency of this control even when utilizing circuit components having normal tolerance in performance characteristics. Of practical importance are the design features of the control system whereby the respective sections thereof may be readily separated physically for ease of installation and servicing in a practical industrial machine such as an electric resistance welder, for example.

Since various changes in detail may be made in the specific control system herein disclosed without departing from the spirit or scope of the invention reference should be had to the appended claims in determining the scope of the invention.

We claim:

1. In apparatus for controlling the flow of electric power from an alternating current source and having a pair of discharge valves connected in inverse parallel relation and each having an ignition electrode and an associated grid-controlled discharge device for conducting current to the said electrode, the improvement comprising a second pair of grid-controlled discharge devices connected to be energized by said source and when energized to apply biasing potentials to the grids of the first mentioned discharge devices, means to apply to the grids of said second pair of discharge devices periodic control potentials bearing pre-selected phase relation to the alternations of the source, a grid-controlled discharge device connected in series in the energizing circuit for said second pair of discharge devices, a further grid-controlled discharge device connected in parallel with said second pair of devices and the last named device, timing means to apply a positive biasing potential to said further discharge device for a predetermined number of cycles, means to initiate conduction in said last named discharge device simultaneously with initiation of conduction in said further discharge device, and energy storage means to apply a positive potential to the grid of said last named discharge device for a part of the half cycle of the source following the cessation of conduction of said further discharge device.

2. In apparatus for controlling the flow of electric power from an alternating current source and having translating means for transmitting predetermined portions of successive half-cycles of the alternating current of the source in response to the application of periodic current impulses bearing predetermined phase relation to the voltage wave of the source, the improvement of an electrical circuit assembly for furnishing said impulses comprising an alternating current supply synchronized with said source, a first discharge circuit connected across said supply and comprising in series a discharge device and parallel related resistance and capacitor connected to the cathode thereof, a second discharge circuit connected across said supply and comprising in series an impulse generator and a grid-controlled discharge device, said capacitor being connected across the cathode and control grid of said last named discharge device to maintain said device conducting for at least one half cycle following interruption of conduction in said first discharge circuit.

3. Apparatus according to claim 2 further characterized in that said impulse generator comprises a pair of grid-controlled discharge devices connected to said supply whereby to alternately transmit successive half-cycles of the alternations of said supply and a transformer primary winding for each of the last named discharge devices and connected in series therewith, and further including a phase-shifting network to energize the control grids of the said last named discharge devices in preselected phase relation to the alternations of said source.

4. Apparatus according to claim 3 further characterized in that said phase-shifting network comprises a pair of circuits for alternate connection to the control grids of these said last named discharge devices to thereby cause these devices to transmit different portions of the successive half cycles of the alternations of said supply, and a relay having switch contacts to connect a selected one of said circuits to the control grids.

5. In apparatus for controlling the flow of alternating current to a load and having electric valves adapted to transmit predetermined portions of the half cycles of a source to said load; the combination of means including a pair of grid controlled discharge valves adapted when energized to condition said electric valves for conduction, said pair of grid-controlled discharge valves being arranged so that upon anode-cathode potential being applied to a first of said pair during a half-cycle portion of potential from said source anode-cathode potential is applied to the other of said pair during the next succeeding half-cycle of potential, grid control circuits for each of said discharge valves, a phase shifting network connected in common in each of said circuits, said phase shifting network comprising alternately employable phase shifting devices, means for independently adjusting said devices, and means for selectively rendering said phase shifting devices operable in said phase shifting network.

6. Apparatus according to claim 5 further characterized by said last mentioned means comprising a relay having normally open and normally closed contacts, and further including an electric discharge device for energizing said relay, and time delay means operative a predetermined time after energization of said electric valves to energize said electric discharge device.

References Cited in the file of this patent

UNITED STATES PATENTS

| | | |
|---|---|---|
| 2,482,892 | Barwick | Sept. 27, 1949 |
| 2,508,145 | Daniels et al. | May 16, 1950 |
| 2,533,318 | Hartwig | Dec. 12, 1950 |
| 2,540,514 | Elliott | Feb. 6, 1951 |
| 2,547,228 | Owens | Apr. 3, 1951 |
| 2,577,411 | Falk | Dec. 4, 1951 |